Aug. 21, 1928.

N. H. CLOUGH 1,681,517

MEANS FOR DAMPING OSCILLATING OR ALTERNATING CURRENT CIRCUITS

Filed June 16, 1926

Inventor
NEWSOME HENRY CLOUGH

By his Attorney

Patented Aug. 21, 1928.

1,681,517

UNITED STATES PATENT OFFICE.

NEWSOME HENRY CLOUGH, OF LONDON, ENGLAND, ASSIGNOR TO RADIO CORPORATION OF AMERICA, A CORPORATION OF DELAWARE.

MEANS FOR DAMPING OSCILLATING OR ALTERNATING CURRENT CIRCUITS.

Application filed June 16, 1926, Serial No. 116,309, and in Great Britain July 20, 1925.

This invention relates to means for damping an alternating current circuit, more particularly of the type used in wireless telegraphy and telephony.

According to this invention there is included, in, or coupled to, the circuit to be damped a condenser, in which the energy absorbing component of current is preferably variable, and is such that it absorbs, to the required degree, energy from the circuit to be damped.

In one form of construction, the condenser is of fixed capacity and comprises a plurality of metallic plates separated by a movable vane or vanes of material, in which the dielectric loss is appreciable.

In a modification, the condenser has plates made of material having a comparatively high ohmic resistance, so that loss takes place in the plates themselves. These plates are so arranged as to be movable relatively to one another to vary the losses.

In a further modification, an ordinary variable condenser is employed, in series with a fixed resistance.

If desired, the condenser may be constructed in such a manner that combinations of the principles embodied in the foregoing constructions are employed. For example in the type of condenser in which the plates are made of a material of low conductivity, the said plates may carry a coating of material in which the dielectric loss is appreciable.

It is preferable in all cases to employ a compensating device, so that the capacity of the condenser does vary appreciably when its energy absorbing component is varied.

A convenient form of such compensating device may comprise a copper or the like plate, shaped or drilled so as to afford the necessary degree of compensation, and so disposed that as the spindle is turned, the said plate replaces in the circuit, to a greater or lesser extent, the bad dielectric element or the bad conductivity plate, according to which is employed.

Figure 1:
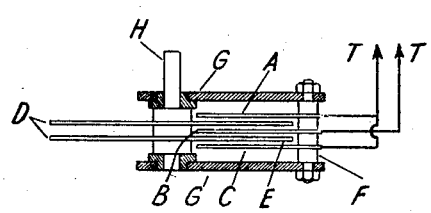
Figure 3:
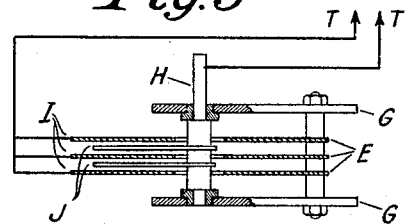
Figure 2:
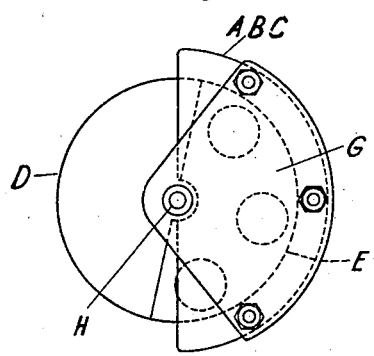
Figure 4:
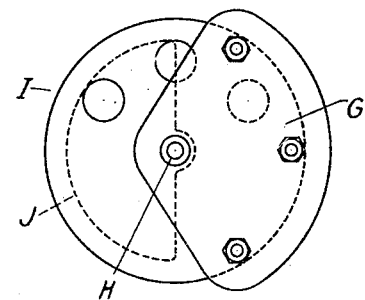
Figure 5:
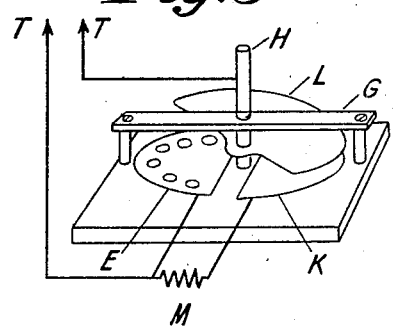
Figure 6:
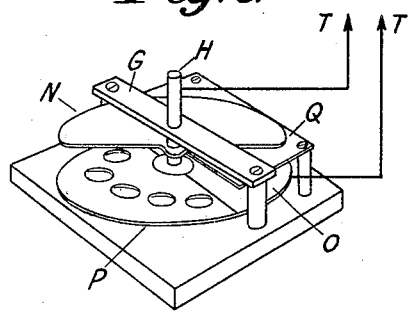

The invention is illustrated in the accompanying drawings, in which Figures 1 and 2 show one form of construction in sectional elevation and plan respectively; Figures 3 and 4 show a modified construction in sectional elevation and plan respectively; and, Figures 5 and 6 show two further modifications.

Referring to Figures 1 and 2, A, B, C are electrically conductive fixed simicircular plates, insulated from one another and mounted upon insulating pieces F, carried between supporting plates G. H is a rotatable spindle mounted in bearings in the plates G and carrying plates formed each in two semicircular parts, one part D of a material having a high dielectric loss, such as low grade ebonite, glass or mica, and the other part E of a conductor such as copper. The parts D are of such size that when the spindle H is rotated to bring them fully between the plates A, B, C they substantially fill the space therebetween. The parts E are for the purpose of compensation, and are made of varying thickness or are drilled (as shown in Figure 2) or are otherwise formed so that the capacity of the whole instrument remains substantially constant when the spindle is rotated to vary the dielectric loss. The plates A, C are connected to one terminal T of the instrument and the plate B to the other.

In the modification shown in Figures 3 and 4, moving plates J and fixed plates I of semicircular form are arranged as in the usual known variable condensers, and are connected respectively to instrument terminals T. Either the fixed or moving plates may be made of a material having a low conductivity, so that a conduction loss occurs therein or even both sets of the plates may be made of such material.

Fixed compensating plates E are provided for the same purpose as in the previous construction. Obviously, if desired, the compensating plates may be mounted upon the spindle and rotate therewith, but the preferred construction is to mount good conducting plates upon the spindle and arrange the bad conducting plates and the compensating plates to be fixed, as shown.

Figure 5 shows a further modification, in which the necessary energy absorbing element is provided as a resistance M, which may be either fixed or variable, but is preferably fixed, connected between the fixed plate K and the compensating plate E, so that as the moving plate L is rotated, the amount of energy absorbed may be varied. The terminals T of the instrument are connected one to the spindle and moving plate, and the other to the resistance.

In the further modification shown in Figure 6, N is a semicircular moving plate adapted to be rotated above a fixed plate O and a compensating plate P. Q is a fixed plate of material having bad dielectric properties and positioned, as shown, to project between the plates N and O.

In all the foregoing constructions, the compensating plates may be omitted in cases where it is not necessary that the capacity be maintained constant. Further, it is obvious that in all the constructions, any number of fixed and moving plates may be employed, the number chosen varying with the amount of damping required in the circuit to which the instrument is to be connected or with which it is to be associated.

Having described my invention, what I claim is:

1. A damping means comprising a condenser, variable means for absorbing a portion of the current passing through the said condenser, and compensating means adapted to maintain constant capacity in said condenser.

2. A damping means comprising a condenser, variable means for absorbing a portion of the current passing through said condenser, said means comprising the provision of means to resist the passage of current, and compensating means adapted to maintain a constant capacity in said condenser.

3. A damping means comprising a condenser, variable means for absorbing a portion of the current passing through said condenser, said absorbing means comprising a material of high dielectric loss which resists the passage of current, and means for maintaining a constant capacity in said condenser.

4. A damping means comprising a condenser, variable means for absorbing a portion of the current passing through said condenser, said absorbing means comprising conductor plates one or more of which has relatively poor conducting properties, and compensating means for maintaining a constant capacity in said condenser.

5. Means for damping an oscillating or alternating current circuit, comprising a condenser having conductor plates some of which have an appreciable variable energy absorbing component of current, and compensating means to maintain the capacity of the condenser substantially constant.

6. Means for damping an oscillating or alternating current circuit comprising a condenser having conductor plates some of which have an appreciable variable energy absorbing component current, the energy absorption being effected by means of a material having an appreciable dielectric loss, and compensating means to maintain the capacity of the condenser substantially constant.

7. Means for damping an oscillating or alternating current circuit comprising a condenser having conductor plates some of which have an appreciable variable energy absorbing component current in which said energy absorption is effected by means of resistance, and compensating means to maintain the capacity of the condenser substantially constant.

8. Means for damping an oscillating or alternating current circuit comprising a condenser having conductor plates some of which have an appreciable variable energy absorbing component current in which the energy absorption is effected by means of a resistance provided by forming one or more of the plates of the condenser of a comparatively poor conductor, and compensating means to maintain the capacity of the condenser substantially constant.

NEWSOME HENRY CLOUGH.